US012684304B2

(12) United States Patent
Stemmer et al.

(10) Patent No.: US 12,684,304 B2
(45) Date of Patent: Jul. 14, 2026

(54) METHODS AND APPARATUS TO GENERATE BINAURAL SOUNDS FOR HEARING DEVICES

(71) Applicant: Intel Corporation, Santa Clara, CA (US)

(72) Inventors: Georg Stemmer, Munich (DE); Hector Cordourier Maruri, Guadalajara (MX); Willem Beltman, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/827,232

(22) Filed: May 27, 2022

(65) Prior Publication Data

US 2022/0286798 A1 Sep. 8, 2022

(51) Int. Cl.
*H04S 3/00* (2006.01)
*H04S 7/00* (2006.01)

(52) U.S. Cl.
CPC .............. *H04S 3/004* (2013.01); *H04S 7/304* (2013.01); *H04S 7/307* (2013.01); *H04S 2400/01* (2013.01); *H04S 2420/01* (2013.01); *H04S 2420/03* (2013.01)

(58) Field of Classification Search
CPC .......... H04S 3/004; H04S 7/304; H04S 7/307; H04S 2400/01; H04S 2420/01; H04S 2420/03
See application file for complete search history.

(56) References Cited

U.S. PATENT DOCUMENTS

| | | | | |
|---|---|---|---|---|
| 11,290,837 B1 * | 3/2022 | Brimijoin, II | H04S 7/304 | |
| 11,589,184 B1 * | 2/2023 | Mont-Reynaud | H04S 7/304 | |
| 2003/0031334 A1 * | 2/2003 | Layton | H04S 3/00 | 381/1 |
| 2014/0010391 A1 * | 1/2014 | Ek | G06F 3/011 | 381/310 |
| 2015/0063610 A1 * | 3/2015 | Mossner | G09B 21/006 | 381/307 |
| 2019/0174246 A1 * | 6/2019 | De Bruijn | G06F 3/012 | |
| 2020/0186953 A1 * | 6/2020 | Mate | G10L 15/22 | |
| 2020/0221243 A1 * | 7/2020 | Schaefer | H04S 3/008 | |
| 2021/0337341 A1 * | 10/2021 | Sakuma | H04S 1/007 | |

* cited by examiner

*Primary Examiner* — Jason R Kurr
(74) *Attorney, Agent, or Firm* — Akona IP PC

(57) ABSTRACT

Methods, apparatus, systems, and articles of manufacture are disclosed to generate binaural sounds for hearing devices. An example apparatus includes processor circuitry to at least access audio data corresponding to multiple devices, ones of the multiple devices positioned at spatial locations relative to a listener, identify a position of the listener relative to the multiple devices, adjust, based on the spatial locations and the position of the listener, the audio data associated with at least one of the multiple devices, transmit the adjusted audio data to a hearing device associated with the listener, the adjusted audio data including a binaural sound corresponding to each of the spatial locations.

24 Claims, 13 Drawing Sheets

METHODS AND APPARATUS TO GENERATE BINAURAL SOUNDS FOR HEARING DEVICES

FIELD OF THE DISCLOSURE

This disclosure relates generally to hearing devices and, more particularly, to methods and apparatus to generate binaural sounds for hearing devices.

BACKGROUND

In recent years, multimedia streaming has become more common. Streaming services, television providers, and websites can stream multimedia, such as video data and audio data, to users via computing devices. Hearing devices can receive audio by connecting to computing devices via Bluetooth, for example.

BRIEF DESCRIPTION OF THE DRAWINGS

In general, the same reference numbers will be used throughout the drawing(s) and accompanying written description to refer to the same or like parts. The figures are not to scale.

Figure 1:
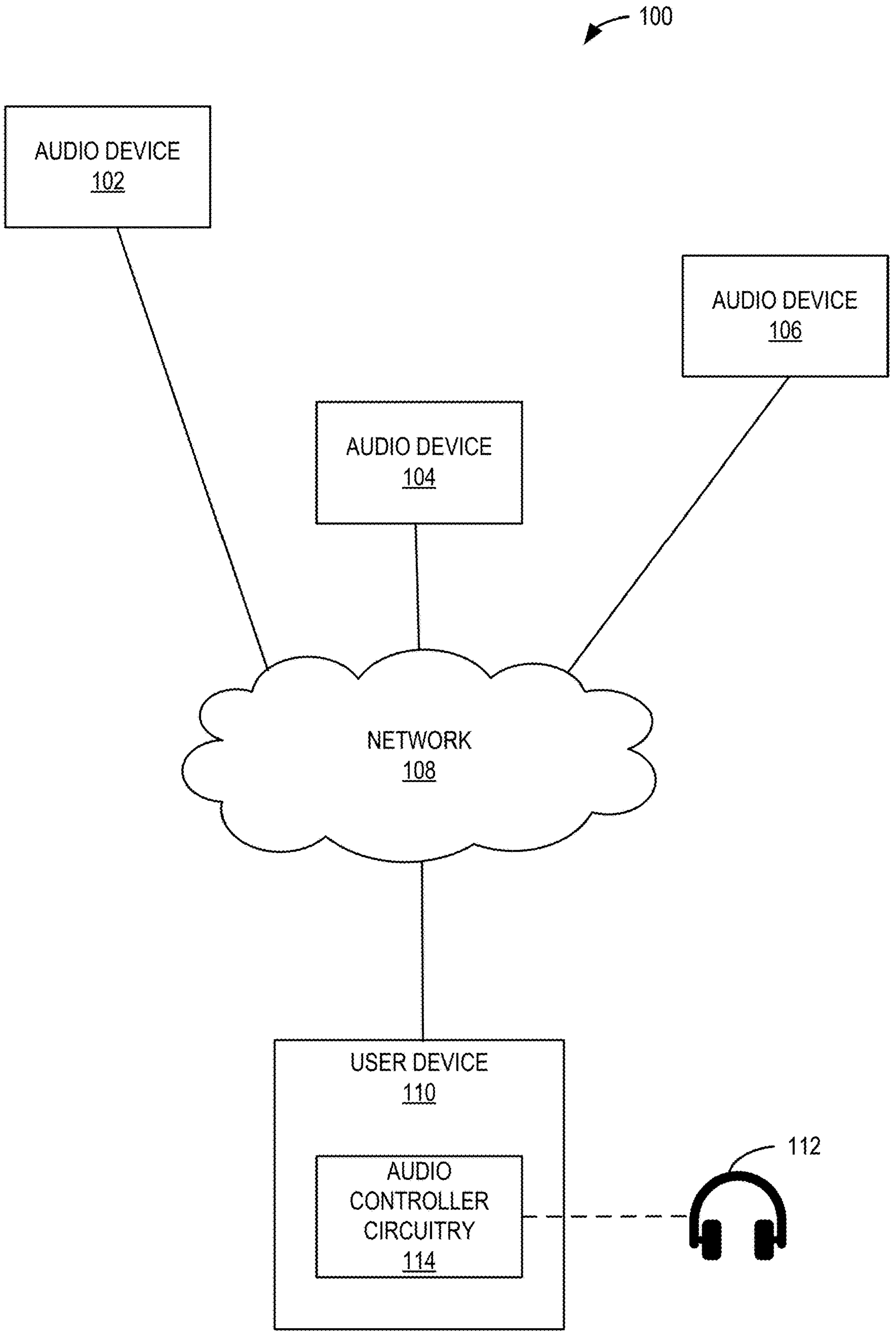
FIG. 1 is an example multi-device system in which the teachings of this disclosure can be implemented.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Hearing devices (e.g., speakers, hearing aids, etc.) can be used to enable a person to hear audio streamed on a computing device. Some example hearing devices such as Bluetooth headphones, audio jack connection headphones, and headsets provide a generally one dimensional (1D) sound (e.g., uniform sound) to a listener. In some examples, a 1D sound lacks directionality and spatial location information of the streaming device. For example, audio streamed on Bluetooth headphones will have a 1D sound transmitted to the listener, irrespective of the location of the device with respect to the listener.

Other example hearing devices such as boombox speakers, smartphone speakers, hearing aids, and wireless speakers, can provide a 3 dimensional (3D) sound (e.g., binaural sound) to a listener. The human auditory system allows a listener to determine where a sound is coming from based on time differences and/or amplitude differences, etc. For example, when places in a room with a speaker that is streaming a song, a listener can audibly detect a location of the speaker (e.g., to the right, to the left, behind, etc.). In some examples, Bluetooth headphones can limit a listener's ability to audibly detect a spatial location (e.g., origin) of audio because the Bluetooth headphones move with the listener's head and, thus, there is no perceived time difference between sound in the listener's ears.

Bluetooth streaming techniques enable the transmission of multiple, independent audio streams (e.g., multi-stream audio) to a user device, such as a smartphone. For example, a user can stream a movie from a laptop and a song from a smartphone such that, with multi-stream Bluetooth techniques, both the audio from the movie and the audio from the song can be simultaneously transmitted to a hearing device of the user (e.g., headphones). However, the multi-stream audio is 1D, lacks spatial location information, lacks directionality, limits prioritization of the audio streams, etc. In some examples, the spatial location information of multi-stream audio can affect the daily life and/or safety of a listener. For example, a hearing disabled individual can rely on hearing aids for communication and spatial awareness. Additionally or alternatively, public environments, such as airports, can include relatively large numbers of devices that broadcast audio, which can complicate (e.g., overburden, overload, etc.) user prioritization of the devices.

Examples disclosed herein generate binaural sound for multi-stream audio. Examples disclosed herein enable Bluetooth streaming of multi-stream audio to hearing devices (e.g., wireless headphones, hearing aids, etc.). Examples disclosed herein transmit a 3D sound to a hearing device of a listener such that the 3D sound simulates the spatial locations of the audio sources. Examples disclosed herein utilize head and/or eye positioning of a listener to conveniently determine prioritization of the multi-stream audio. Examples disclosed herein enhance (e.g., modify, adjust, etc.) the multi-stream audio based on the spatial locations of the audio sources. Examples disclosed herein enable transmission of multi-stream audio in public environments (e.g., airports, cafés, concert halls, etc.).

As used herein, "multi-stream audio" refers to an audio stream comprising multiple audio streams from different sources. For example, an audio stream comprising a song from a smartphone and a video from a laptop can be defined as "multi-stream audio" because the song and the video are mixed (e.g., combined) into a single audio stream.

As used herein, an "audio device" refers to any computing device capable of streaming audio. For example, a smartphone can be an audio device that streams music. In some examples, any device capable of streaming video (e.g., movies, music videos, TV shows, video conferencing, etc.) can be an audio device because the video data can have corresponding audio data. In some examples, musical instruments can audio devices that transmit music. In some examples, telephones can be audio devices that stream phone calls. In some examples, radios (e.g., car radios) can be audio devices that stream music, podcasts, commercials, etc.

As used herein, a "binaural sound" and/or a "3D sound" refers to sound received by two ears of a listener in space. Additionally or alternatively, a binaural sound enables humans and/or animals to determine the direction and origin of sounds. In some examples, a binaural sound can be generated via computing devices and transmitted (e.g., via Bluetooth) to a listener.

As used herein, a "listener" refers to a human person and/or being operating (e.g., utilizing) a device that is streaming audio. For example, a smartphone can receive an audio stream from a TV via Bluetooth, wherein the human operating the smartphone is defined as the "listener". In some examples, multiple audio devices can stream audio to a laptop, wherein the listener operates the laptop. In some examples, the listener can control (e.g., prioritize) audio devices for streaming.

Examples disclosed herein include processor circuitry to execute the instructions to at least access audio data corresponding to multiple devices, ones of the multiple devices positioned at spatial locations relative to a listener, identify a position of the listener relative to the multiple devices, adjust, based on the spatial locations and the position of the listener, the audio data associated with at least one of the multiple devices, transmit the adjusted audio data to a hearing device (e.g., wireless headphones, hearing aids, etc.) associated with the listener, the adjusted audio data including a binaural sound corresponding to each of the spatial locations.

FIG. 1 illustrates an example multi-device system 100 in which examples disclosed herein can be implemented. The multi-device system 100 includes example audio devices 102, 104, 106, an example network 108, an example user device 110, and an example hearing device 112. The example user device includes example audio controller circuitry 114.

The example audio devices 102, 104, 106 stream audio (e.g., music). Each of the example audio devices 102, 104, 106 can stream (e.g., broadcast) different audio data. For example, the example audio device 102 can stream a song and the example audio device 104 can stream a movie, wherein the song and the movie include different audio data. In some examples, the devices 102, 104, 106 are location based shared audio sources. Additionally or alternatively, each of the example audio devices 102, 104, 106 can be different types of devices. For example, the audio device 102 can be a laptop, the audio device 104 can be a television (TV), and/or the audio device 106 can be a tablet. However, the example audio devices 102, 104, 106 can be any combination of devices and/or any number of devices (e.g., three TVs, two TVs and one laptop, three tablets, etc.). While in this example, the multi-device system 100 includes three devices 102, 104, 106, in other examples, the multi-device system 100 can includes any number of devices and/or any combination of devices.

The example network 108 can be implemented by any suitable wired and/or wireless network(s) including, for example, one or more data buses, one or more Local Area Networks (LANs), one or more wireless LANS, one or more cellular networks, one or more public networks, etc. The example network 108 enables transmission of data (e.g., audio data) between the devices 102, 104, 106, 110 of the multi-device system 100.

In the illustrated example of FIG. 1, the user device 110 can be implemented as any type of electronic device capable of receiving audio such as a smartphone, a desktop computer, a tablet, a laptop computer, etc. In some examples, the user device 110 can stream audio to a listener (e.g., the device 110 can be included among the devices 102, 104, 106). The example user device 110 can be configured to receive input from a user (e.g., a listener). For example, the device 110 can include a Graphical User Interface (GUI), wherein the user can interact with the device 110 via graphical icons associated with the GUI. Additionally or alternatively, the example user device 110 can include a microphone for detecting vocal prompts (e.g., voice commands, voice input, etc.) from a user of the device 110. Further, the example user device 110 can include a camera for detecting an image of the user. As such, the example user device 110 can access data (e.g., input data, positioning data, voice input, etc.) associated with the user of the device 110. Many systems allow the user to control the user device 110 (e.g., a computer system) and provide data to the device 110 (e.g., computer) using physical gestures such as but not limited to hand or body movements, facial expressions, and face recognition.

The example hearing device 112 can be implemented as any device capable of receiving audio data. In some examples, the hearing device 112 is implemented as a wireless speaker, wireless headphones (e.g., Bluetooth headphones), audio jack connection headphones, hearing aids, headsets, boombox speakers, etc.

In the example multi-device system 100 of FIG. 1, the example audio devices 102, 104, 106 stream audio data to the user device 110. For example, audio devices 102, 104, 106 transmit audio data to the user device 110 via the example network 108. The example user device 110 is communicatively coupled (e.g., via Bluetooth) to each of the devices 102, 104, 106 such that the user device 110 receives a first audio stream (e.g., a song) from the device 102 (e.g., a tablet), a second audio stream (e.g., audio from a sports game) from the device 104 (e.g., TV), and a third audio stream (e.g., audio associated with a movie) from the device 106 (e.g., TV). The example audio devices 102, 104, 106 have spatial locations relative to the user device 110 (e.g., to the right, to the left, centered, etc.). However, the example audio devices 102, 104, 106 can have spatial locations relative to a user (e.g., a listener) of the user device 110, described in detail in conjunction with FIGS. 3-8.

The example user device 110 utilizes the audio controller circuitry 114 to generate a binaural sound, wherein the binaural sound includes the audio data from each of the devices 102, 104, 106. In the example of FIG. 1, the binaural sound corresponds to each of the spatial locations of the audio devices 102, 104, 106. In the example of FIG. 1, the audio controller circuitry 114 transmits the binaural sound to the hearing device 112, described in detail in conjunction with FIG. 2. In some examples, the hearing device 112 is associated with a user (e.g., listener) of the user device 110.

Figure 2:
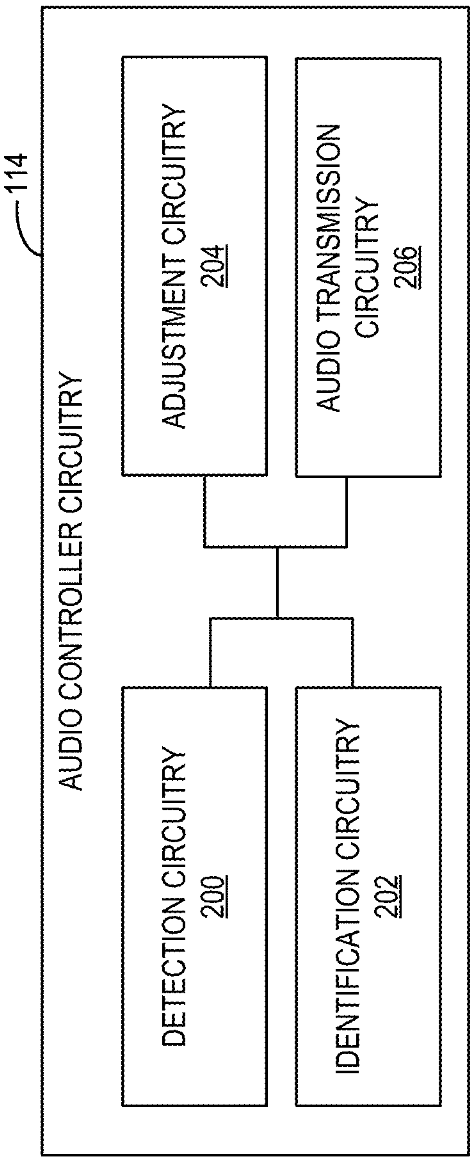
FIG. 2 is a block diagram of example audio controller circuitry included in the system of FIG. 1.

FIG. 2 is a block diagram of the audio controller circuitry 114 to generate a binaural sound. The audio controller circuitry 114 of FIGS. 1 and 2 may be instantiated (e.g., creating an instance of, bring into being for any length of time, materialize, implement, etc.) by processor circuitry such as a central processing unit executing instructions. Additionally or alternatively, the example audio controller circuitry 114 of FIGS. 1 and 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example audio controller circuitry 114 of the example of FIGS. 1 and 2 includes example detection circuitry 200, example identification circuitry 202, example adjustment circuitry 204, and example audio transmission circuitry 206.

The example detection circuitry 200 accesses (e.g., receives) audio data corresponding to multiple devices (e.g., the audio devices 102, 104, 106). In some examples, the example detection circuitry 200 can detect (e.g., access) audio data corresponding to music, video, human speech, movies, TV shows, etc. As such, the example detection circuitry 200 can receive audio data from laptops, smartphones, radios, TVs, tablets, desktop computers, etc. In some examples, the example detection circuitry 200 receives audio data corresponding to multiple devices via a network (e.g., the network 108). In some examples, ones of the multiple devices are positioned at spatial locations relative to a listener. The example detection circuitry 200 can determine the spatial locations corresponding to each of the multiple devices (e.g., with respect to the listener). Additionally or alternatively, the example detection circuitry 200 can determine the spatial location of the listener with respect to the multiple devices. In some examples, the detection circuitry 200 can detect an angle of arrival of an audio signal from each of the devices. In some examples, the detection circuitry 200 is instantiated by processor circuitry executing detection instructions and/or configured to perform operations such as those represented by the flowcharts of FIGS. 10-12.

In some examples, the example audio controller circuitry 114 includes means for accessing audio data corresponding to multiple devices. For example, the means for accessing may be implemented by the example detection circuitry 200. In some examples, the example detection circuitry 200 may be instantiated by processor circuitry such as the example processor circuitry 1312 of FIG. 13. For instance, the example detection circuitry 200 may be instantiated by the example microprocessor 1400 of FIG. 14 executing machine executable instructions such as those implemented by at least blocks 1002 of FIG. 10. In some examples, the detection circuitry 200 may be instantiated by hardware logic circuitry, which may be implemented by an ASIC, XPU, or the FPGA circuitry 1500 of FIG. 15 structured to perform operations corresponding to the machine readable instructions. Additionally or alternatively, the example detection circuitry 200 may be instantiated by any other combination of hardware, software, and/or firmware. For example, the detection circuitry 200 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example identification circuitry 202 identifies (e.g., determines, etc.) a position of the listener (e.g., the user of the user device 110). In some examples, the identification circuitry 202 can detect head orientation of the listener, eye positioning of the listener, body orientation of the listener, and/or an attention (e.g., viewing direction) of the listener. In some examples, the identification circuitry 202 can identify when the eyes of the listener are looking at a first one of the devices 102, 104, 106. In some examples, the identification circuitry 202 can identify when the head is facing (e.g., oriented towards) a first one of the devices 102, 104, 106. In some examples, the identification circuitry 202 identifies a change in the position of the listener. For example, the identification circuitry 202 can detect a change in eye orientation (e.g., positioning, eyes open, eyes closed, etc.) of the listener, a change in head orientation of the listener, a change in body orientation of the listener, and/or a change of attention of the listener. In some examples, the identification circuitry 202 can utilize a camera associated with the user device 110, a gyroscope included in the hearing device 112, ultrasonic localization methods, an accelerometer, and/or Wi-Fi localization methods to identify a position (e.g., a change in position) of the listener. In some examples, the identification circuitry 202 is instantiated by processor circuitry executing identification instructions and/or configured to perform operations such as those represented by the flowcharts of FIGS. 10-12.

In some examples, the example audio controller circuitry 114 includes means for identifying a position (e.g., a change in position) of the listener. For example, the means for identifying may be implemented by the example identification circuitry 202. In some examples, the example identification circuitry 202 may be instantiated by processor circuitry such as the example processor circuitry 1312 of FIG. 13. For instance, the example identification circuitry 202 may be instantiated by the example microprocessor 1400 of FIG. 14 executing machine executable instructions such as those implemented by at least block 1004 of FIG. 10 and blocks 1100, 1102, 1104 of FIG. 11. In some examples, the identification circuitry 202 may be instantiated by hardware logic circuitry, which may be implemented by an ASIC, XPU, or the FPGA circuitry 1500 of FIG. 15 structured to perform operations corresponding to the machine readable instructions. Additionally or alternatively, the example identification circuitry 202 may be instantiated by any other combination of hardware, software, and/or firmware. For example, the identification circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example adjustment circuitry 204 adjusts (e.g., increases, decreases, changes, etc.) the audio data associated with at least one of the devices 102, 104, 106. In some examples, the adjustment circuitry 204 adjusts the audio data based on the spatial locations of the devices 102, 104, 106 and the position of the listener (e.g., eyes looking towards the device 102, head turned to the device 104, eyes looking towards the user device 110, etc.). For example, when the eyes of the listener are looking towards the device 102, the example adjustment circuitry 204 adjusts the audio data associated with the device 102. In some examples, when the head of the listener is facing (e.g., oriented towards) the device 104, the adjustment circuitry 204 adjusts the audio data associated with the device 104. In some examples, the adjustment circuitry 204 adjusts the audio data associated with at least one of the devices 102, 104, 106, 110 based on the spatial locations of the devices 102, 104, 106, 110. In some examples, the adjustment circuitry 204 adjusts a gain of the audio data associated with at least one of the devices 102, 104, 106, 110. For example, when the device 102 is positioned at a spatial location closer to the user device 110 (e.g., the listener of the user device 110) than the spatial location of the device 104, then the example adjustment circuitry 204 increases the gain associated with the device 102. Additionally or alternatively, the example adjustment circuitry 204 decreases the gain associated with the device 104 based on the spatial locations of the devices 102, 104 (e.g., the device 104 positioned farther from the listener than the device 102).

In some examples, the adjustment circuitry 204 adjusts the audio data (e.g., gain) of at least one of the devices 102, 104, 106, 110 based on a change in the position of the listener. For example, when the head of the listener turns to face the device 106, the example adjustment circuitry 204 adjusts the gain of the audio data associated with the device 106. In some examples, the adjustment circuitry 204 adjusts the audio data associated with at least one of the devices 102, 104, 106, 110 based on a voice command from the listener. For example, when the listener prompts the device 110 with a verbal command to indicate the device 106 is high priority, the example adjustment circuitry 204 increases the gain associated with the device 106. In some examples, the listener can prompt the device 110 with a verbal command to indicate the devices 102, 104 are low priority. As such, the example adjustment circuitry 204 decreases the gain associated with the devices 102, 104 (e.g., based on user input, based on priority, listener preference, etc.). In some examples, the adjustment circuitry 204 is instantiated by processor circuitry executing adjustment instructions and/or configured to perform operations such as those represented by the flowcharts of FIGS. 10-12.

In some examples, the example audio controller circuitry 114 includes means for adjusting the audio data of the devices. For example, the means for adjusting may be implemented by the example adjustment circuitry 204. In some examples, the example adjustment circuitry 204 may be instantiated by processor circuitry such as the example processor circuitry 1312 of FIG. 13. For instance, the example adjustment circuitry 204 may be instantiated by the example microprocessor 1400 of FIG. 14 executing machine executable instructions such as those implemented by at least block 1006 of FIG. 10 and blocks 1200, 1202, 1204 of FIG. 12. In some examples, the adjustment circuitry 204 may be instantiated by hardware logic circuitry, which may be implemented by an ASIC, XPU, or the FPGA circuitry 1500 of FIG. 15 structured to perform operations corresponding to the machine readable instructions. Additionally or alternatively, the example adjustment circuitry 204 may be instantiated by any other combination of hardware, software, and/or firmware. For example, the adjustment circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example audio transmission circuitry 206 transmits the audio data (e.g., the adjusted audio data) of the devices

102, 104, 106, 110 to a hearing device (e.g., the hearing device 112) associated with the listener. In some examples, the adjusted audio data includes a binaural sound corresponding to each of the spatial locations associated with the devices 102, 104, 106, 110. In some examples, the user device 110 is communicatively coupled (e.g., via Bluetooth, via audio jack, etc.) to the hearing device 112. As such, the example audio transmission circuitry 206 can transmit (e.g., send) the audio data to the hearing device 112 and, thus, to the ears of the listener. In some examples, the audio transmission circuitry 206 is instantiated by processor circuitry executing audio transmission instructions and/or configured to perform operations such as those represented by the flowcharts of FIGS. 10-12.

In some examples, the example audio controller circuitry 114 includes means for transmitting audio (e.g., the adjusted audio) of the devices. For example, the means for transmitting may be implemented by the example audio transmission circuitry 206. In some examples, the example audio transmission circuitry 206 may be instantiated by processor circuitry such as the example processor circuitry 1312 of FIG. 13. For instance, the example audio transmission circuitry 206 may be instantiated by the example microprocessor 1400 of FIG. 14 executing machine executable instructions such as those implemented by at least block 1008 of FIG. 10. In some examples, the audio transmission circuitry 206 may be instantiated by hardware logic circuitry, which may be implemented by an ASIC, XPU, or the FPGA circuitry 1500 of FIG. 15 structured to perform operations corresponding to the machine readable instructions. Additionally or alternatively, the example audio transmission circuitry 206 may be instantiated by any other combination of hardware, software, and/or firmware. For example, the audio transmission circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example detection circuitry 200 accesses audio data corresponding to the audio devices 102, 104, 106. In some examples, the example detection circuitry 200 receives audio data corresponding to the audio devices 102, 104, 106 via the network 108. The example detection circuitry 200 determines the spatial locations corresponding to each of the audio devices 102, 104, 106. The example identification circuitry 202 identifies a position of the listener. In some examples, the identification circuitry 202 identifies a change in the position of the listener.

The example adjustment circuitry 204 adjusts the audio data associated with at least one of the devices 102, 104, 106, 110. In some examples, the adjustment circuitry 204 adjusts the audio data based on the spatial locations of the devices 102, 104, 106 determined by the detection circuitry 200. Additionally or alternatively, the adjustment circuitry 204 adjusts the audio data based on the position of the listener determined by the identification circuitry 202. In some examples, the detection circuitry 200 detects a voice command from the listener indicating a priority of the devices 102, 104, 106, 110. As such, the adjustment circuitry 204 can adjust the audio data associated with at least one of the devices 102, 104, 106, 110 based on the voice command. The example audio transmission circuitry 206 transmits the audio data adjusted by the adjustment circuitry 204 to the hearing device 112, wherein the adjusted audio data includes a binaural sound corresponding to each of the spatial locations associated with the devices 102, 104, 106, 110 and/or the position of the listener.

Figure 3:
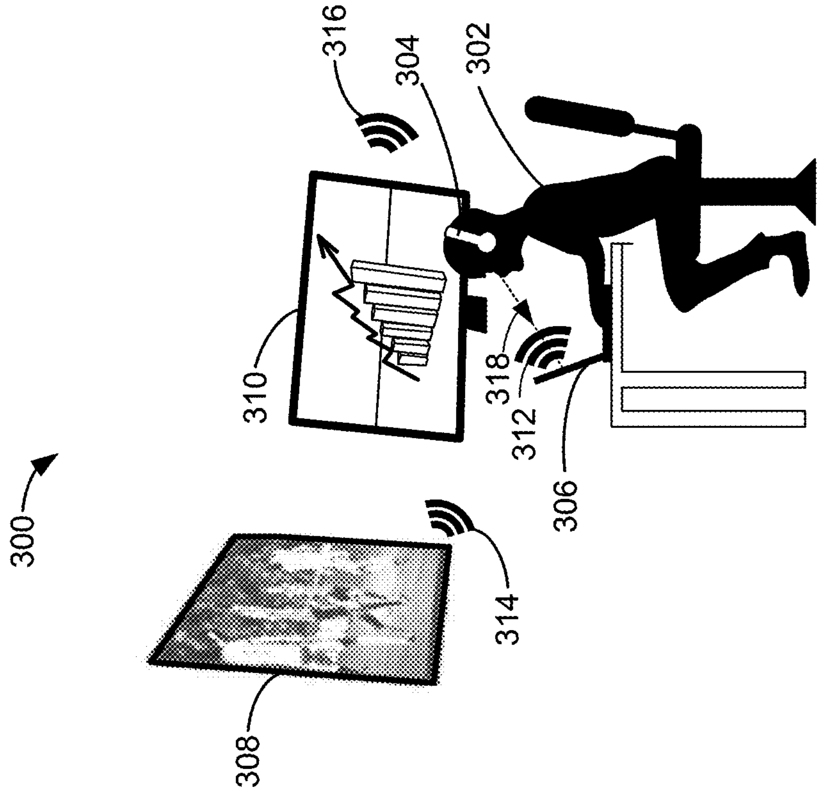

FIG. 3 illustrates a first example scenario in an example streaming environment 300 in which the teachings of this disclosure can be implemented. The example streaming environment 300 includes a listener 302, a hearing device 304, a laptop 306, a TV 308, and a TV 310. The example streaming environment 300 of FIG. 3 is similar to the example multi-device system 100 of FIG. 1, but, instead, the laptop 306 represents the user device 110, the TVs 308, 310 represent at least two of the devices 102, 104, 106, and the hearing device 304 represents the hearing device 112. In the illustrated example of FIG. 3, the example laptop 306 is streaming audio, as generally represented by an audio signal 312. Additionally or alternatively, the example TV 308 is streaming audio, as generally represented by an audio signal 314, and the example TV 310 is streaming audio, as generally represented by an audio signal 316. In FIG. 3, the TVs 308, 310 are communicatively coupled to the laptop 306 (e.g., via Bluetooth).

In FIG. 3, the example laptop 306, the example TV 308, and the example TV 310 are positioned at spatial locations relative to the listener 302. The example laptop 306 is positioned generally in front of the body of the listener 302 and below the head of the listener 302. The example TV 308 is positioned generally in front of the body of the listener 302 and above the head of the listener 302. The example TV 310 is positioned generally to the right hand side (e.g., to the right) of the listener 302 and above the head of the listener 302. In the illustrated example of FIG. 3, the head (e.g., eyes, gaze, etc.) of the listener 302 is oriented towards the laptop 306, in a direction as generally indicated by arrow 318.

In the example streaming environment 300 of FIG. 3, the laptop 306 includes the audio controller circuitry 114 (FIG. 1). Thus, the example audio controller circuitry 114 can generate a binaural sound, wherein the binaural sound is transmitted to the hearing device 304 and includes the audio data from each of the devices 306, 308, 310. The example detection circuitry 200 (FIG. 2) can determine the spatial locations corresponding to each of the devices 306, 308, 310 (e.g., with respect to the listener 302). For example, the detection circuitry 200 detects the audio signals 312, 314, 316 and the spatial locations of the device 306, 308, 310 with respect to the listener 302. The example identification circuitry 202 (FIG. 2) identifies a position of the listener 302. For example, the identification circuitry 202 identifies the head of the listener 302 facing towards the device 306. Additionally or alternatively, the example identification circuitry 202 identifies the eyes of the listener 302 to be looking at the device 306. In some examples, the identification circuitry 202 can utilize a camera associated with the laptop 306, a gyroscope included in the hearing device 304, ultrasonic localization methods, an accelerometer, and/or Wi-Fi localization methods to identify a position (e.g., a change in position) of the listener 302.

The example adjustment circuitry 204 (FIG. 2) adjusts the audio data (e.g., the audio signals 312, 314, 316) associated with at least one of the devices 306, 308, 310. The example adjustment circuitry 204 adjusts the audio data based on the spatial locations of the devices 306, 308, 310 and the position of the listener 302. In the illustrated example of FIG. 3, the adjustment circuitry 204 increases the gain of the audio signal 312 based on the device 306 being positioned closer to the listener 302 than the TVs 308, 310. Additionally or alternatively, the example adjustment circuitry 204 increases the gain of the audio signal 312 based on the position of the listener 302 oriented towards the laptop 306. In some examples, the adjustment circuitry 204 adjusts the audio signals 314, 316. For example, the adjustment circuitry 204 decreases the gain of the audio signals 314, 316 based on the TVs 308, 310 positioned farther from the listener 302 compared to the laptop 306. Additionally or alternatively, the example adjustment circuitry 204 decreases the gain of the audio signals 314, 316 based on the position of the listener 302 oriented towards the laptop 306. In some examples, the listener 302 can prompt the laptop 306 (e.g., the audio controller circuitry 114) with a voice command. For example, the listener 302 can verbally indicate the laptop 306 as high priority and the example adjustment circuitry 204 can increase the gain associated with the laptop 306. However, the listener 302 can verbally indicate that the TVs 308, 310 are low priority. As such, the example adjustment circuitry 204 decreases the gain associated with the TVs 308, 310 (e.g., based on user input, based on priority, listener preference, etc.). In such examples, the laptop 306 can include a microphone to receive voice commands from the listener 302.

The example audio transmission circuitry 206 transmits the adjusted audio signals 312, 314, 316 to the hearing device 304. In particular, the adjusted audio signals 312, 314, 316 generate (e.g., produce) a binaural sound corresponding to each of the spatial locations of the devices 306, 308, 310 and the position of the listener 302. As such, the laptop 306 transmits an adjusted audio signal to the hearing device 304 that represents the spatial locations of the device 306, 308, 310. For example, the listener 302 can hear the adjusted audio signal 316 via the hearing device 304 as though it were coming from the right (e.g., louder in the right ear, quieter in the left ear, etc.). Thus, the example hearing device 304 receives (e.g., accesses) a binaural sound that represents the streaming environment 300 of FIG. 3.

Figure 4:
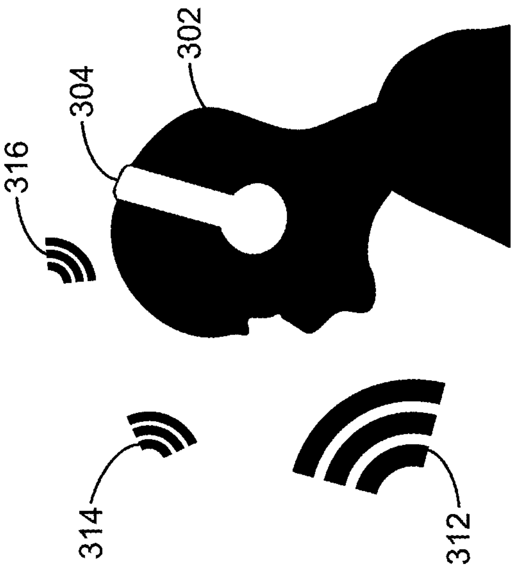
FIGS. 3 and 4 illustrate an example scenario in an example streaming environment in which the teachings of this disclosure can be implemented.

FIG. 4 illustrates the binaural sound transmitted to the hearing device 304 corresponding to the example streaming environment 300 of FIG. 3. For example, the relative sizes and orientation of the audio signals 312, 314, 316 represent the transmitted audio from the audio controller circuitry 114. In particular, based on the spatial location of the laptop 306 being the closest of the devices 306, 308, 310 to the listener 302 and/or the position of the listener 302 oriented towards the laptop 306, the audio signal 312 can be the loudest of the signals 312, 314, 316. Thus, in FIG. 4, the example audio signal 312 is the largest in size of the example audio signals 312, 314, 316.

Figure 5:
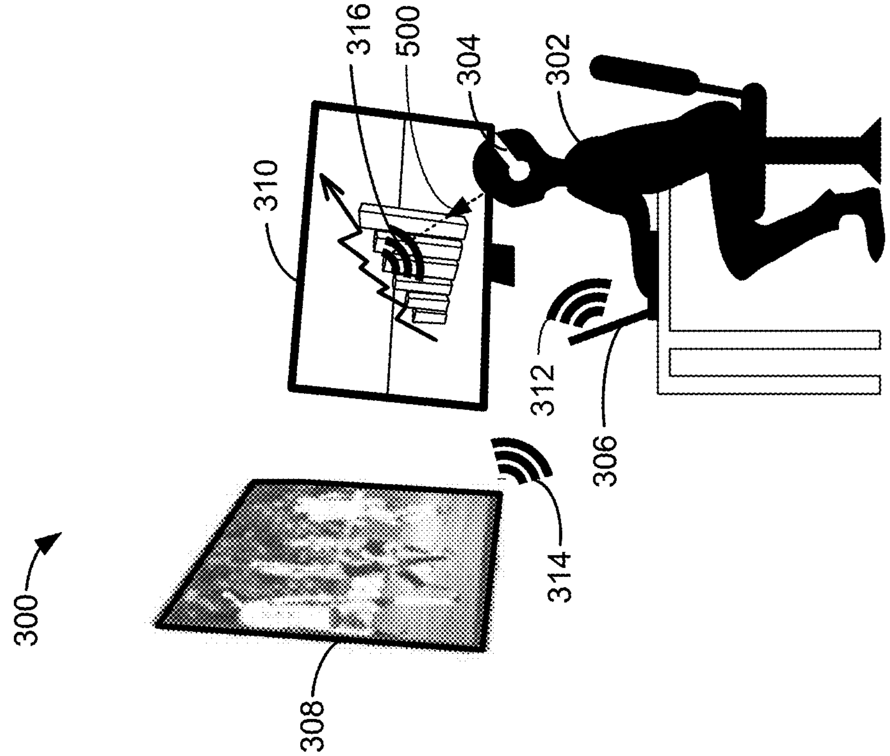

FIG. 5 illustrates a second example scenario in the example streaming environment 300. The example streaming environment 300 of FIG. 5 is similar to the example streaming environment 300 of FIG. 3, but, instead, includes a changed position of the example listener 302. In particular, the example listener 302 is facing (e.g., positioned towards, oriented towards, etc.) the TV 310, in a direction as generally indicated by arrow 500. In some examples, the identification circuitry 202 identifies the eye positioning of the listener 302, the head positioning of the listener 302, the attention of the listener 302, and/or the body positioning of the listener 302 as facing the TV 310. In the illustrated example of FIG. 5, the adjustment circuitry 204 increases the gain of the audio signal 316 based on the position of the listener 302 oriented towards the TV 310. Additionally or alternatively, the example adjustment circuitry 204 decreases the gain of the audio signals 312, 314 based on the position of the listener 302 oriented towards (e.g., facing) the TV 310.

Figure 6:
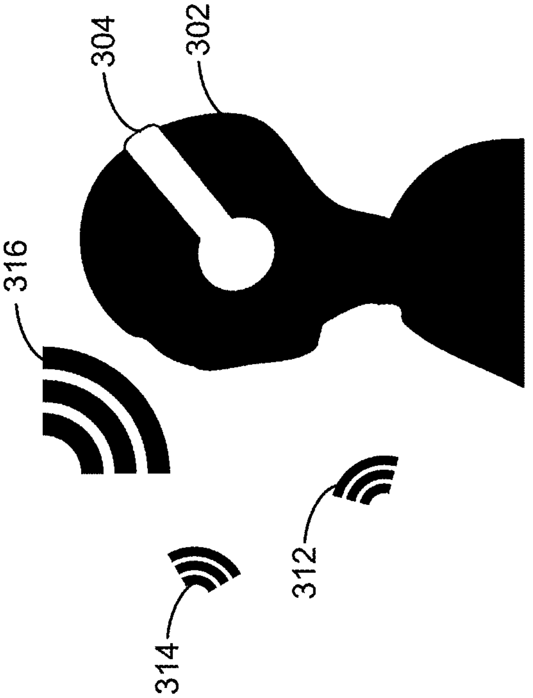
FIGS. 5 and 6 illustrate another example scenario in the example streaming environment of FIG. 3 in which the teachings of this disclosure can be implemented.

FIG. 6 illustrates the binaural sound transmitted to the hearing device 304 corresponding to the example streaming environment 300 of FIG. 5. For example, the relative sizes and orientation of the audio signals 312, 314, 316 represent the transmitted audio from the audio controller circuitry 114. In particular, based on the position of the listener 302 oriented towards the TV 310, the audio signal 316 can be the loudest of the signals 312, 314, 316. Thus, in FIG. 6, the example audio signal 316 is the largest in size of the example audio signals 312, 314, 316.

Figure 7:
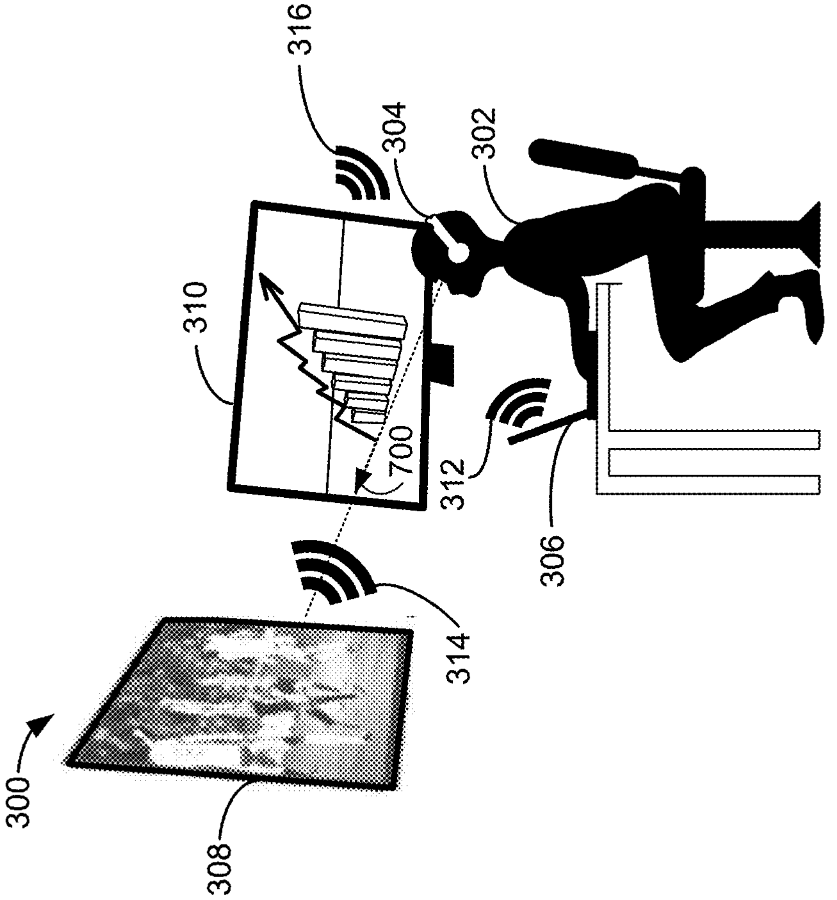

FIG. 7 illustrates a third example scenario in the example streaming environment 300. The example streaming environment 300 of FIG. 7 is similar to the example streaming environment 300 of FIG. 3, but, instead, includes a changed position of the example listener 302. In particular, the example listener 302 is facing (e.g., positioned towards, oriented towards, etc.) the TV 308, in a direction as generally indicated by arrow 700. In some examples, the identification circuitry 202 identifies the eye positioning of the listener 302, the head positioning of the listener 302, the attention of the listener 302, and/or the body positioning of the listener 302 as facing the TV 308. In the illustrated example of FIG. 7, the adjustment circuitry 204 increases the gain of the audio signal 314 based on the position of the listener 302 oriented towards the TV 308. Additionally or alternatively, the example adjustment circuitry 204 decreases the gain of the audio signals 312, 316 based on the position of the listener 302 oriented towards (e.g., facing) the TV 308.

Figure 8:
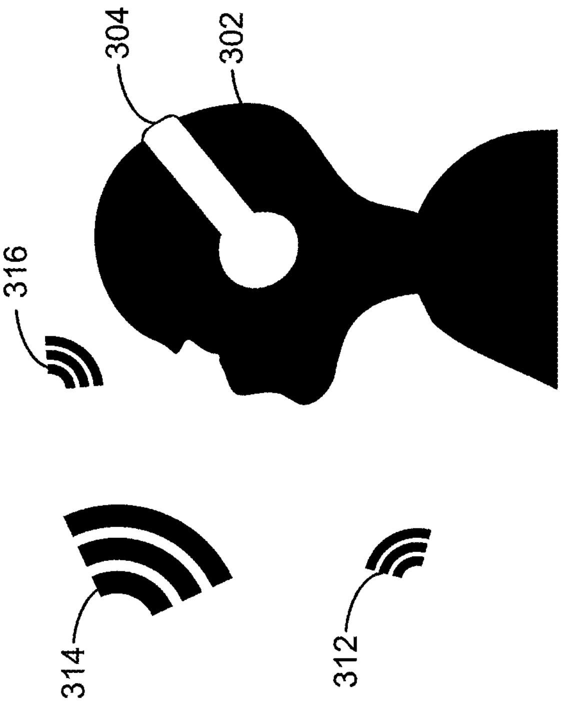
FIGS. 7 and 8 illustrate yet another example scenario in the example streaming environment of FIG. 3 in which the teachings of this disclosure can be implemented.

FIG. 8 illustrates the binaural sound transmitted to the hearing device 304 corresponding to the example streaming environment 300 of FIG. 7. For example, the relative sizes and orientation of the audio signals 312, 314, 316 represent the transmitted audio from the audio controller circuitry 114. In particular, based on the position of the listener 302 oriented towards the TV 308, the audio signal 314 can be the loudest of the signals 312, 314, 316. Thus, in FIG. 8, the example audio signal 314 is the largest in size of the example audio signals 312, 314, 316.

Figure 9:
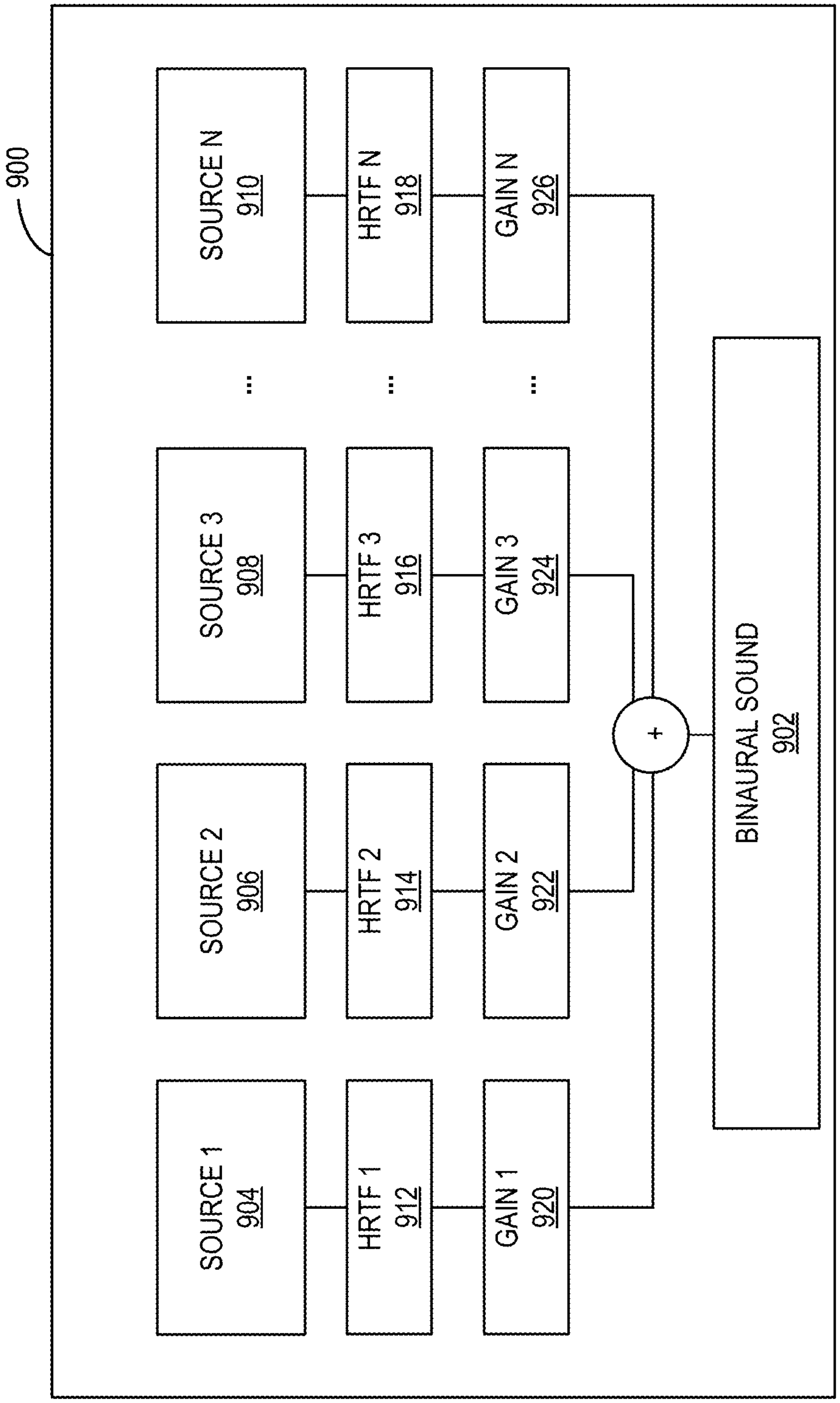
FIG. 9 is an example process flow to generate a binaural sound.

FIG. 9 illustrates an example process flow 900 to compute (e.g., generate) an example binaural sound 902. The example detection circuitry 200 detects example source 1 904, example source 2 906, example source 3 908, and example source N 910 in an example streaming environment (e.g., the example streaming environment 300). The example sources (e.g., audio devices) 904, 906, 908, 910 can include any device capable of streaming audio. In the example configuration of FIG. 9, the source N 910 represents any number N of sources (e.g., audio devices) that can be included in an example streaming environment. For example, the audio controller circuitry 114 can compute a binaural sound for three devices such as the devices 306, 308, 310, four devices such as the devices 102, 104, 106, 110, and/or any number of devices N. The example detection circuitry 200 detects the spatial locations of the sources 904, 906, 908, 910. Each of the example sources 904, 906, 908, 910 is associated with a position of the listener (e.g., the position of the listener as identified by the example identification circuitry 202). In the example of FIG. 9, Head-Related-Transfer Functions (HRTFs) 912, 914, 916, 918 are determined for each of the sources 904, 906, 908, 910. The example HRTFs 912, 914, 916, 918 utilize the spatial locations of the sources 904, 906, 908, 910 and the position of the listener (e.g., the listener 302) to compute the spectral characteristics of the audio signals. For example, the source 1 904 is positioned at a first spatial location relative to a listener and the listener is situated at a first position (e.g., head turned right, eyes looking at source 1 904, etc.) relative to the source 1 904. Thus, the HRTF 1 912 is calculated based on the first spatial location and the first position. Additionally or alternatively, the example source 2 906 is positioned at a second spatial location relative to the listener and the listener is situated at a second position relative to the source 2 906. Thus, the HRTF 2 914 is calculated based on the second spatial location and the second position. Further, the example source 3 908 is positioned at a third spatial location relative to the listener and the listener is situated at a third position relative to the source 3 908. Thus, the HRTF 3 916 is calculated based on the third spatial location and the third position. Accordingly, the example source N 910 is positioned at an $n^{th}$ spatial location relative to the listener and the listener is situated at an $n^{th}$ position relative to the source N 910. Thus, the HRTF N 918 is calculated based on the $n^{th}$ spatial location and the $n^{th}$ position.

In the example of FIG. 9, the audio data corresponding to each of the example sources 904, 906, 908, 910 can be adjusted based on the HRTFs 912, 914, 916, 918. The example adjustment circuitry 204 can calculate gain 920 based on HRTF 912, gain 922 based on HRTF 914, gain 924 based on HRTF 916, and gain 926 based on HRTF 918. In some examples, the gains 920, 922, 924, 926 can correspond to different volume levels of the audio data corresponding to each of the sources 904, 906, 908, 910. The adjusted audio data of the sources 904, 906, 908, 910, are adjusted to the gains 920, 922, 924, 926, which produces (e.g., outputs) the example binaural sound 902.

While an example manner of implementing the audio controller circuitry 114 of FIG. 1 is illustrated in FIG. 2, one or more of the elements, processes, and/or devices illustrated in FIG. 2 may be combined, divided, re-arranged, omitted, eliminated, and/or implemented in any other way. Further, the example detection circuitry 200, the example identification circuitry 202, the example adjustment circuitry 204, the example audio transmission circuitry 206, and/or, more generally, the example audio controller circuitry 114 of FIG. 1, may be implemented by hardware alone or by hardware in combination with software and/or firmware. Thus, for example, any of the example detection circuitry 200, the example identification circuitry 202, the example adjustment circuitry 204, the example audio transmission circuitry 206, and/or, more generally, the example audio controller circuitry 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example audio controller circuitry 114 of FIG. 1 may include one or more elements, processes, and/or devices in addition to, or instead of, those illustrated in FIG. 2, and/or may include more than one of any or all of the illustrated elements, processes and devices.

Figure 10:
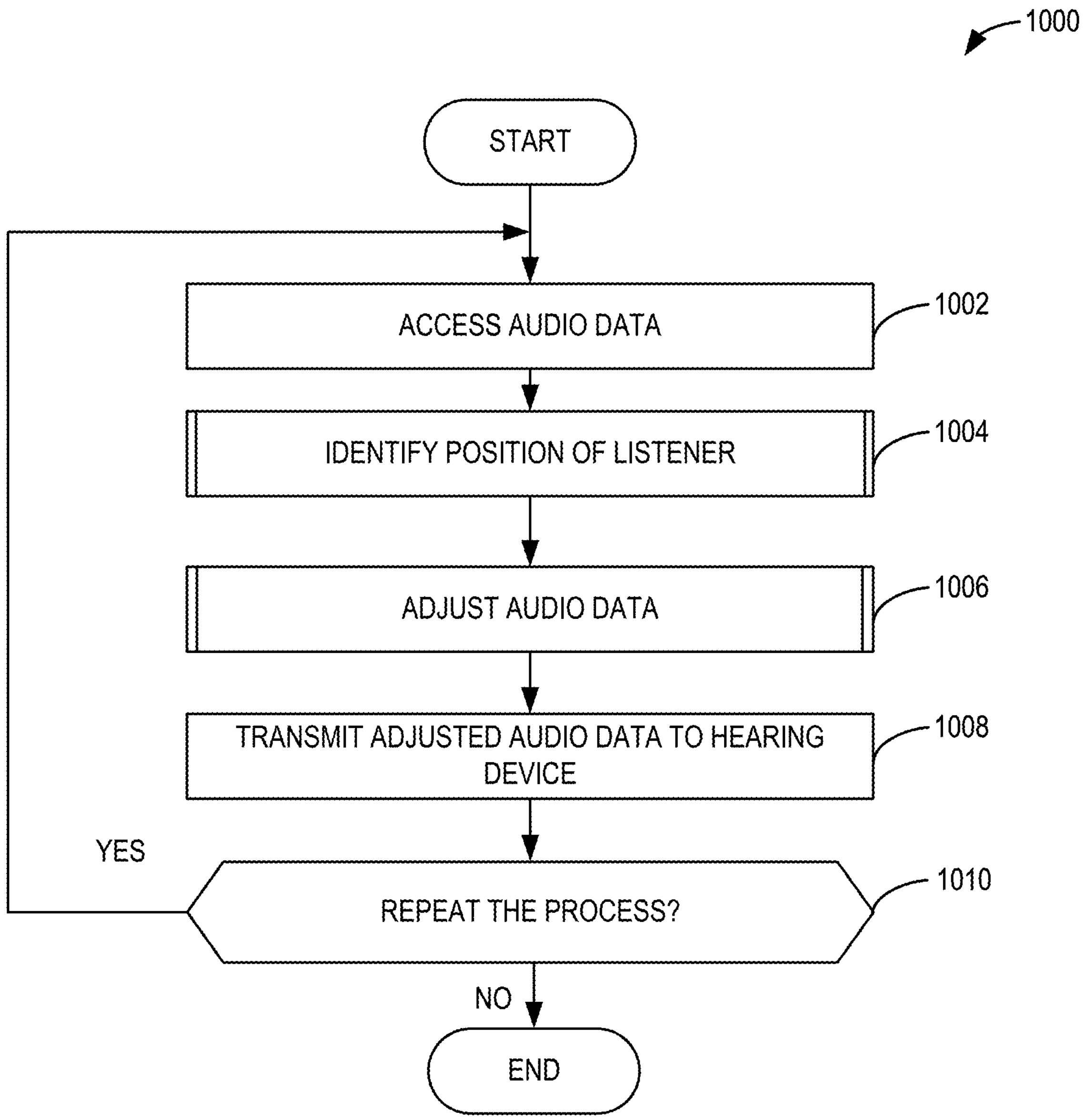
FIG. 10 is a flowchart representative of example machine readable instructions and/or example operations that may be executed by example processor circuitry to implement the audio controller circuitry of FIGS. 1 and 2.
Figure 11:
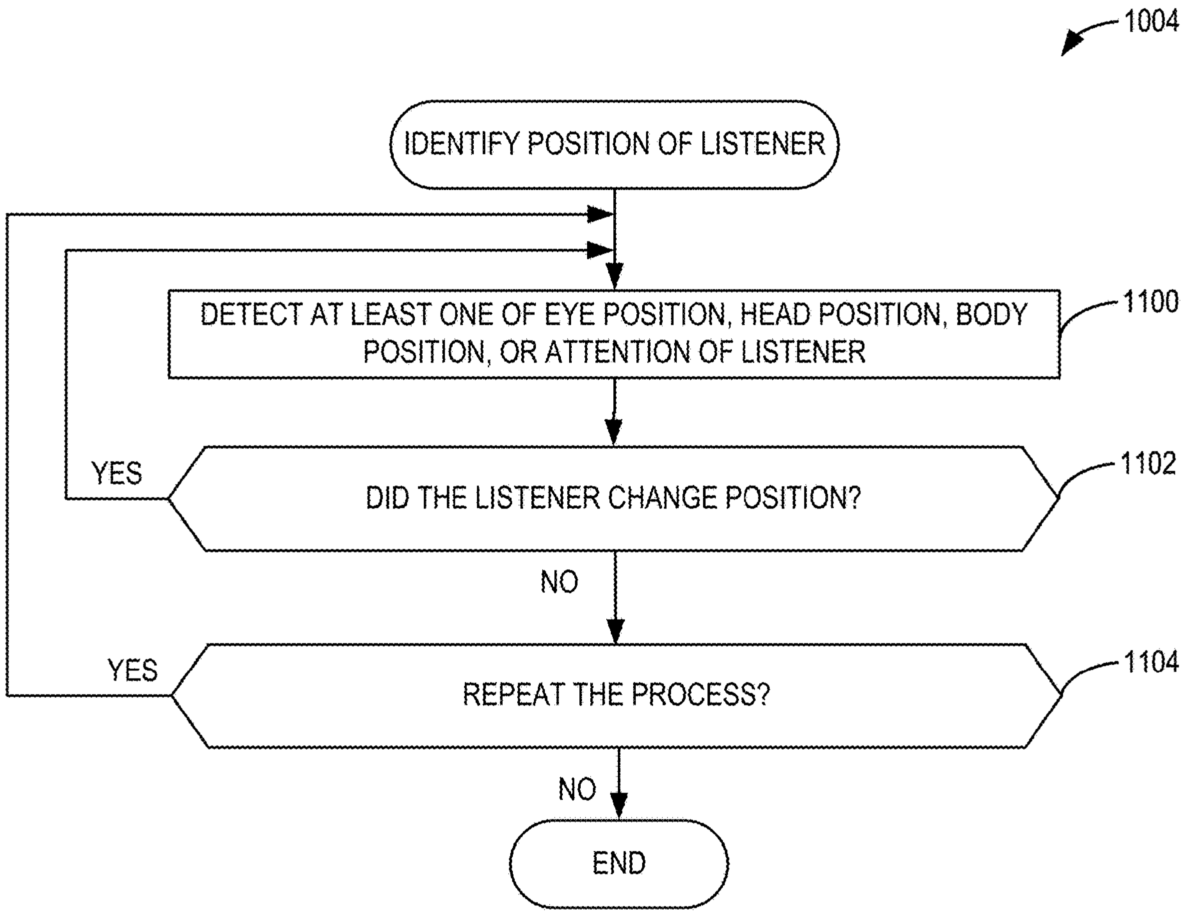
FIG. 11 is a flowchart representative of example machine readable instructions and/or example operations that may be executed by example processor circuitry to implement the audio controller circuitry of FIGS. 1 and 2.
Figure 12:
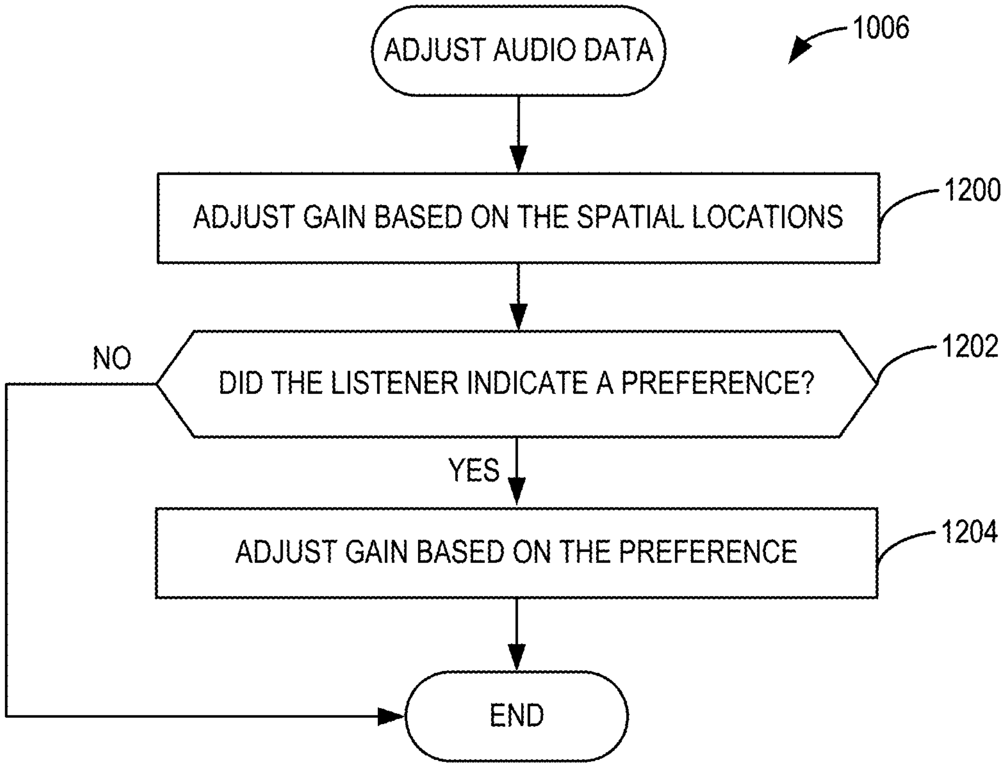
FIG. 12 is a flowchart representative of example machine readable instructions and/or example operations that may be executed by example processor circuitry to implement the audio controller circuitry of FIGS. 1 and 2.

Flowcharts representative of example machine readable instructions which may be executed to configure processor circuitry to implement the audio controller circuitry 114 of FIG. 2, is shown in FIGS. 10-12. The machine readable instructions may be one or more executable programs or portion(s) of an executable program for execution by processor circuitry, such as the processor circuitry 412 shown in the example processor platform 400 discussed below in connection with FIG. 4 and/or the example processor circuitry discussed below in connection with FIGS. 5 and/or 6. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 10-12, many other methods of implementing the example audio controller circuitry 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 10-12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 10 is a flowchart representative of example machine readable instructions and/or example operations 1000 that may be executed and/or instantiated by processor circuitry to generate a binaural sound. The machine readable instructions and/or the operations 1000 of FIG. 10 begin at block 1002, at which the example detection circuitry 200 accesses audio data corresponding to multiple devices (e.g., the devices 102, 104, 106, 110, 306, 308, 310, 904, 906, 908, 910, etc.). In some examples, the example detection circuitry 200 receives audio data (e.g., the audio signals 312, 314, 316) corresponding to the devices 306, 308, 310 via a network (e.g., the network 108). In some examples, the example detection circuitry 200 determines the spatial locations corresponding to each of the devices 306, 308, 310. However, the example detection circuitry 200 can determine the spatial location of the listener 302 with respect to the multiple devices 306, 308, 310. Additionally or alternatively, the example detection circuitry 200 can determine a change in the spatial locations of the devices 306, 308, 310. In some examples, the detection circuitry 200 detects movements of the devices 306, 308, 310 (e.g., the device 306 moved 3 feet to the right).

At block 1004, the example identification circuitry 202 identifies a position of the listener 302, further described in conjunction with FIG. 11. In some examples, the example identification circuitry 202 identifies a position of the user of the user device 110.

At block 1006, the example adjustment circuitry 204 adjusts the audio data corresponding to at least one of the devices 306, 308, 310, further described in conjunction with FIG. 12. In some examples, the adjustment circuitry 204 adjusts the audio data based on the spatial locations of the multiple devices 306, 308, 310 and the position of the listener 302.

At block 1008, the example audio transmission circuitry 206 transmits the adjusted audio to a hearing device (e.g., the hearing device 112, the hearing device 304, etc.) associated with the listener 302. In some examples, the audio transmission circuitry 206 transmits a binaural sound corresponding to each of the spatial locations associated with the devices 306, 308, 310, wherein the binaural sound includes the adjusted audio data. In some examples, the audio transmission circuitry 206 transmits the adjusted audio data to the laptop 306 via Bluetooth. In some examples, the audio transmission circuitry 206 transmits the adjusted audio data to the ears of the listener 302 via the hearing device 304. In some examples, the audio transmission circuitry 206 communicatively couples the hearing device 304 to the device 306.

At block 1010, it is determined whether to repeat the process. If the process is to be repeated (block 1010), control of the process returns to the block 1002. Otherwise the process ends.

FIG. 11 is a flowchart representative of example machine readable instructions and/or example operations that may be executed and/or instantiated by processor circuitry to implement the example identification circuitry 202, as described above in conjunction with block 1004 of FIG. 10. The machine readable instructions and/or the operations of FIG. 11 begin at block 1100, at which the example identification circuitry 202 detects at least one of an eye position, a head position, a body position, and/or an attention of the listener 302, etc. In some examples, the identification circuitry 202 can identify when the eyes of the listener 302 are looking at one of the devices 306, 308, 310. In some examples, the identification circuitry 202 can identify when the head of the listener 302 is facing one of the devices 306, 308, 310. In some examples, the identification circuitry 202 can utilize a camera associated with one of the devices 306, 308, 310, a gyroscope included in the hearing device 304, ultrasonic localization methods, an accelerometer, and/or Wi-Fi localization methods to identify a position of the listener 302.

At block 1102, the example identification circuitry 202 determines whether the listener 302 changed positions. For example, the identification circuitry 202 can detect a change in eye orientation of the listener 302, a change in head orientation of the listener 302, a change in body orientation of the listener 302, and/or a change of attention of the listener 302. If the listener 302 changed positions (block 1102), control of the process returns to the block 1100. Otherwise the process continues to block 1104.

At block 1104, the example identification circuitry 202 determines whether to repeat the process. If the process is to be repeated (block 1104), control of the process returns to the block 1100. Otherwise the process ends.

FIG. 12 is a flowchart representative of example machine readable instructions and/or example operations that may be executed and/or instantiated by processor circuitry to implement the example adjustment circuitry 204, as described above in conjunction with block 1006 of FIG. 10. The machine readable instructions and/or the operations of FIG. 12 begin at block 1200, at which the example adjustment circuitry 204 adjusts the gain of the devices 306, 308, 310 based on the spatial locations. In some examples, the adjustment circuitry 204 increases the gain associated with the device 306 based on the device 306 positioned closer to the listener 302 than the devices 308, 310. In some examples, the adjustment circuitry decreases the gain associated with the device 308 based on the device 308 positioned farther from the listener 302 than the devices 306, 310.

At block 1202, the example adjustment circuitry 204 determines whether the listener 302 indicated a preference (e.g., priority). In some examples, the adjustment circuitry 204 adjusts the audio data associated with at least one of the devices 306, 308, 310 based on a voice command from the listener 302. For example, the listener 302 can verbally indicate the device 306 as high priority. However, the listener 302 can verbally indicate that the devices 308, 310 are low priority. In some examples, the adjustment circuitry 204 can utilize a microphone associated with at least one of the devices 306, 308, 310 to access a voice command of the listener 302. In some examples, the adjustment circuitry 204 can access a Graphical User Interface (GUI) included in the device 306 such as a user menu, for example. In some examples, the listener 302 can interact with (e.g., click, select, etc.) the devices 306, 308, 310 via the GUI to indicate a preference for at least one of the devices 306, 308, 310. If the listener 302 indicates a preference (block 1202), control of the process proceeds to block 1204. Otherwise the process ends.

At block 1204, the example adjustment circuitry 203 adjusts the gain of at least one of the devices 306, 308, 310 based on the indicated preference. In some examples, the example adjustment circuitry 204 can increase the gain associated with the device 306. In some examples, the adjustment circuitry 204 decreases the gain associated with the devices 308, 310. The example instructions or operations of FIG. 12 ends.

Figure 13:
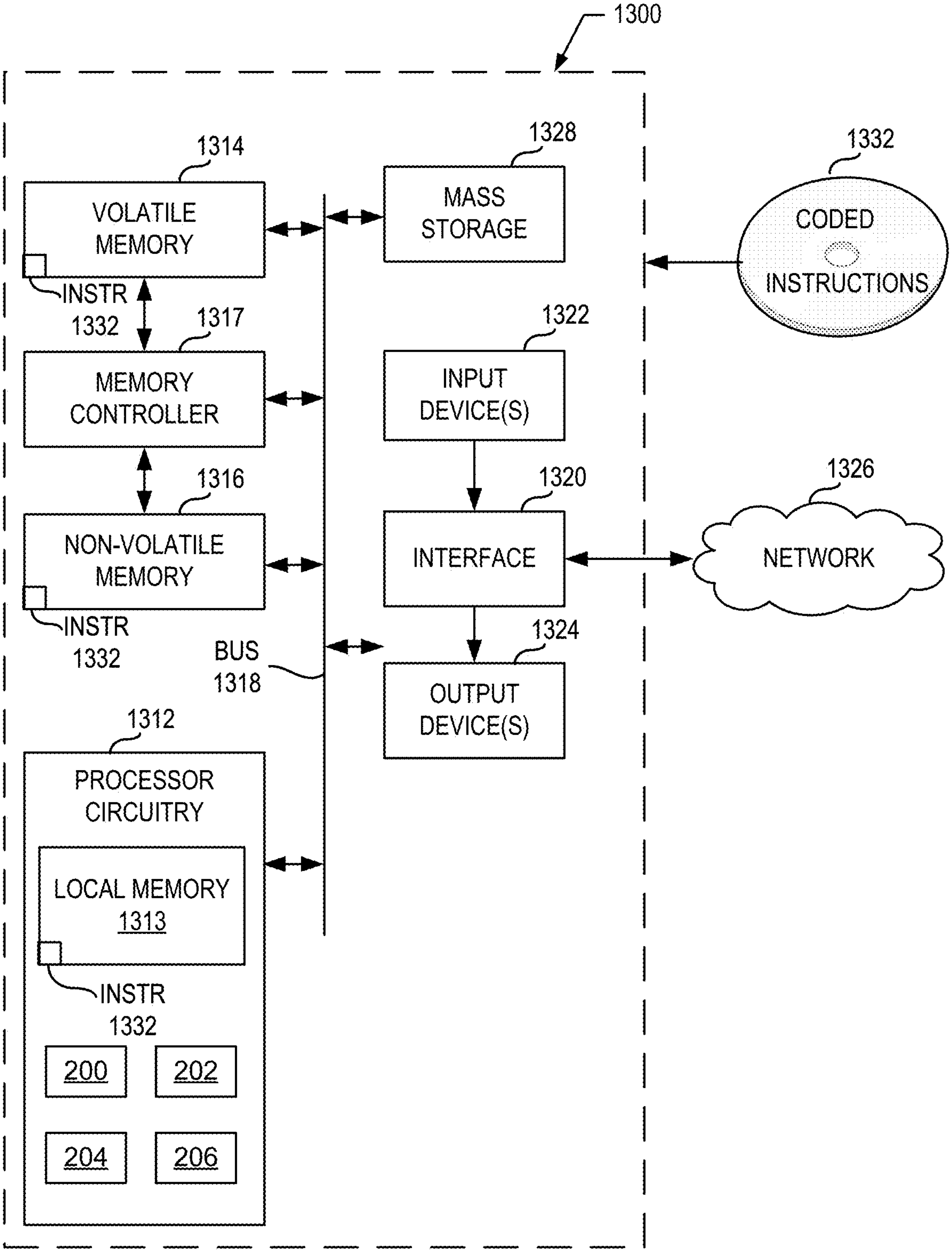
FIG. 13 is a block diagram of an example processing platform including processor circuitry structured to execute the example machine readable instructions and/or the example operations of FIGS. 10-12 to implement the audio controller circuitry of FIGS. 1 and 2.

FIG. 13 is a block diagram of an example processor platform 1300 structured to execute and/or instantiate the machine readable instructions and/or the operations of FIGS. 10-12 to implement the audio controller circuitry 114 of FIGS. 1 and 2. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example detection circuitry 200, the example identification circuitry 202, the example adjustment circuitry 204, and the example audio transmission circuitry 206.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output device(s) 1324 can be implemented, for example, by a speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1332, which may be implemented by the machine readable instructions of FIGS. 10-12, may be stored in the mass storage device 1328, in the volatile memory 1314, in the non-volatile memory 1316, and/or on a removable non-transitory computer readable storage medium such as a CD or DVD.

Figure 14:
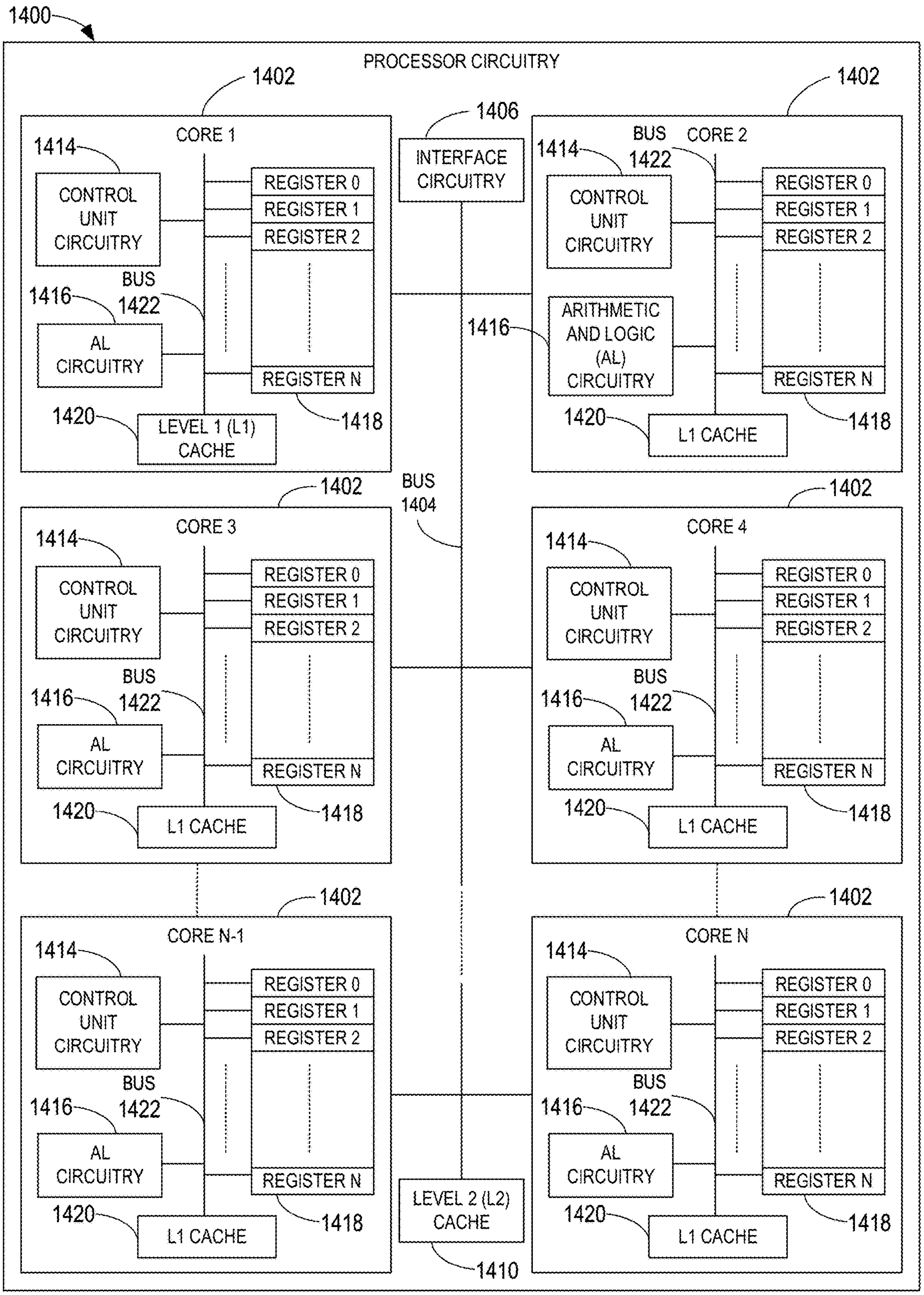
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may be a general purpose microprocessor (e.g., general purpose microprocessor circuitry). The microprocessor 1400 executes some or all of the machine readable instructions of the flowcharts of FIGS. 10-12 to effectively instantiate the audio controller circuitry 114 of FIGS. 1 and 2 as logic circuits to perform the operations corresponding to those machine readable instructions. In some such examples, the audio controller circuitry 114 of FIGS. 1 and 2 is instantiated by the hardware circuits of the microprocessor 1400 in combination with the instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 10-12.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may be implemented by at least one of an I2C bus, a SPI bus, a PCI bus, or a PCIe bus.

Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
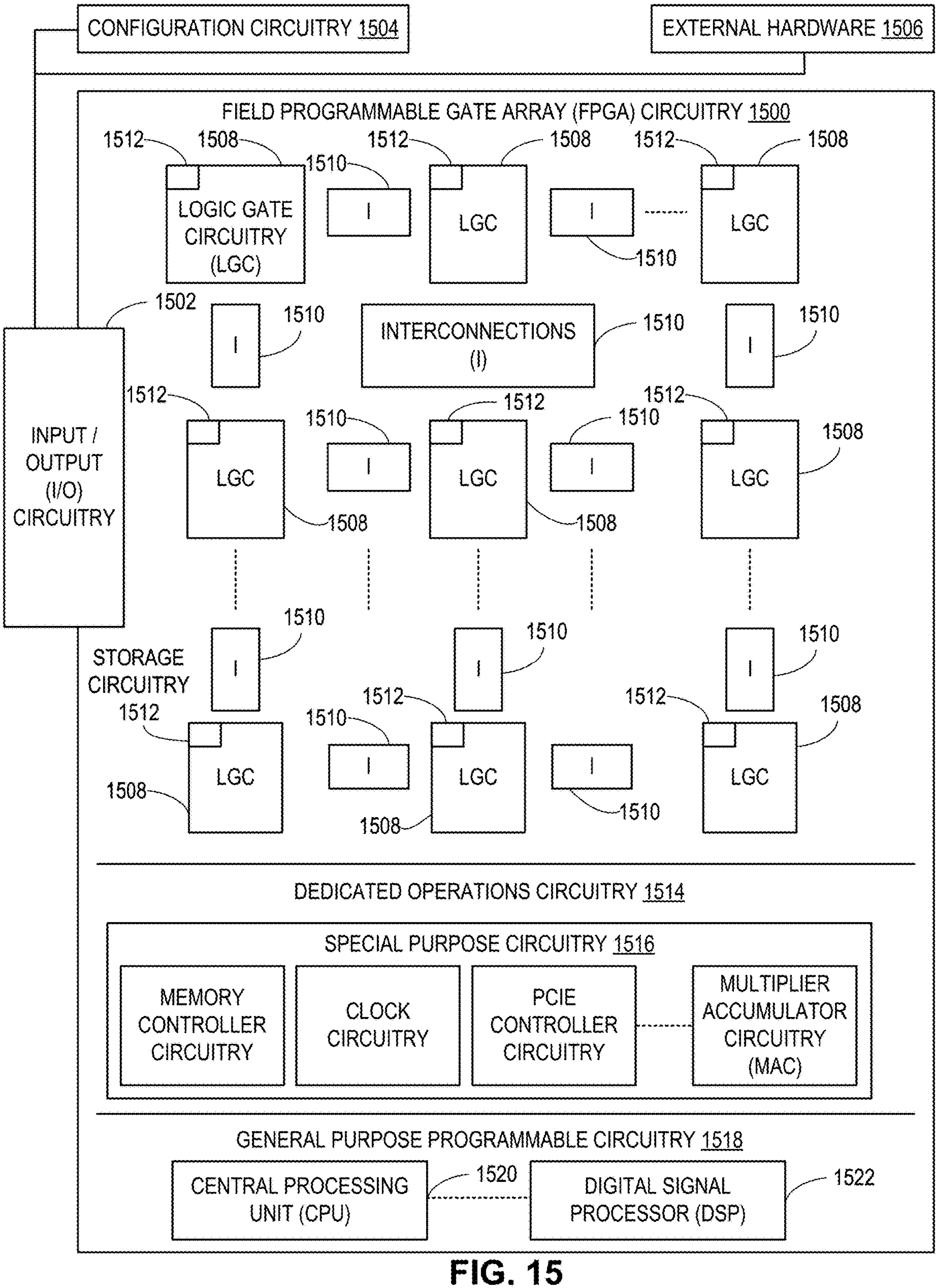
FIG. 15 is a block diagram of another example implementation of the processor circuitry of FIG. 13.
Figure 16:
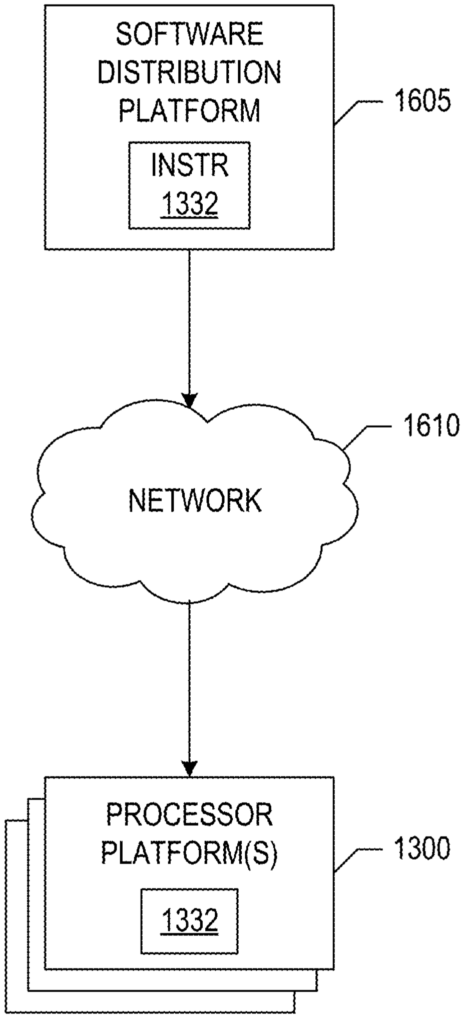
FIG. 16 is a block diagram of an example software distribution platform (e.g., one or more servers) to distribute software (e.g., software corresponding to the example machine readable instructions of FIGS. 9-12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

FIG. 15 is a block diagram of another example implementation of the processor circuitry 1312 of FIG. 13. In this example, the processor circuitry 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 10-12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 10-12. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 10-12. As such, the FPGA circuitry 1500 may be structured to effectively instantiate some or all of the machine readable instructions of the flowcharts of FIGS. 10-12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIGS. 10-12 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may be implemented by external hardware circuitry. For example, the external hardware 1506 may be implemented by the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations that may correspond to at least some of the machine readable instructions of FIGS. 10-12 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an on-board CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 10-12 may be executed by one or more of the cores 1402 of FIG. 14, a second portion of the machine readable instructions represented by the flowcharts of FIGS. 10-12 may be executed by the FPGA circuitry 1500 of FIG. 15, and/or a third portion of the machine readable instructions represented by the flowcharts of FIG. 10-12 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

A block diagram illustrating an example software distribution platform 1605 to distribute software such as the example machine readable instructions 1332 of FIG. 13 to hardware devices owned and/or operated by third parties is illustrated in FIG. 13. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1332, which may correspond to the example machine readable instructions 1000, 1004, 1006 of FIGS. 10-12, as described above. The one or more servers of the example software distribution platform 1605 are in communication with an example network 1610, which may correspond to any one or more of the Internet and/or any of the example networks 108, 1610 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the example machine readable instructions 1000, 1004, 1006 of FIGS. 10-12, may be downloaded to the example processor platform 1300, which is to execute the machine readable instructions 1332 to implement the audio controller circuitry 114. In some examples, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that generate binaural sound for multi-stream audio. Examples disclosed herein transmit a 3D sound to a hearing device of a listener such that the 3D sound simulates the spatial locations of the audio sources. Examples disclosed herein utilize head and/or eye positioning of a listener to conveniently determine prioritization and gains of the multi-stream audio. Examples disclosed herein enhance the multi-stream audio based on the spatial locations of the audio source. Disclosed systems, methods, apparatus, and articles of manufacture improve the efficiency of using a computing device by transmission of multi-stream audio in public environments, simulating a binaural sound to a hearing device of a listener, and generating a binaural sound based on spatial locations of audio devices and an orientation of a listener. Disclosed systems, methods, apparatus, and articles of manufacture are accordingly directed to one or more improvement(s) in the operation of a machine such as a computer or other electronic and/or mechanical device.

Example 1 includes a computing device comprising at least one memory, machine readable instructions, and processor circuitry to at least one of instantiate or execute the machine readable instructions to access audio data corresponding to multiple devices, ones of the multiple devices positioned at spatial locations relative to a listener, identify a position of the listener relative to the multiple devices, adjust, based on the spatial locations and the position of the listener, the audio data associated with at least one of the multiple devices, transmit the adjusted audio data to a hearing device associated with the listener, the adjusted audio data including a binaural sound corresponding to each of the spatial locations.

Example 2 includes the computing device of example 1, wherein the position is based on at least one of a head of the listener, eyes of the listener, a body of the listener, or an attention of the listener.

Example 3 includes the computing device of example 2, wherein the eyes are looking at a first one of the multiple devices, and wherein the processor circuitry is to adjust, based on the eyes looking at the first one of the multiple devices, the audio data associated with the first one of the multiple devices.

Example 4 includes the computing devices of example 3, wherein the processor circuitry is to increase a gain associated with the first one of the multiple devices based on the eyes.

Example 5 includes the computing device of example 2, wherein the head is oriented towards a first one of the multiple devices, and wherein the processor circuitry is to adjust, based on the head oriented towards the first one of the multiple devices, the audio data associated with the first one of the multiple devices.

Example 6 includes the computing device of example 1, wherein the processor circuitry is to adjust a gain associated with the at least one of the multiple devices.

Example 7 includes the computing device of example 6, wherein a first one of the multiple devices is positioned at a first spatial location and a second one of the multiple devices is positioned at a second spatial location, the first spatial location positioned closer to the listener than the second spatial location, and wherein the processor circuitry is to increase the gain associated with the first one of the multiple devices.

Example 8 includes the computing device of example 7, wherein the processor circuitry is to decrease the gain associated with the second one of the multiple devices.

Example 9 includes the computing device of example 1, wherein the processor circuitry is to detect a change in the position of the listener, and adjust, based on the spatial locations and the changed position, the audio data associated with at least one of the multiple devices.

Example 10 includes the computing device of example 9, wherein the change in the position includes at least one of a change in eye orientation of the listener, a change in head orientation of the listener, a change in body orientation of the listener, or a change of attention of the listener.

Example 11 includes the computing device of example 1, wherein the multiple devices include the computing device.

Example 12 includes the computing device of example 1, wherein the processor circuitry is to access a voice command of the listener, and adjust, based on the voice command, the audio data associated with at least one of the multiple devices.

Example 13 includes the computing device of example 1, wherein the processor circuitry is to access a preference of the listener, and adjust, based on the preference, the audio data associated with at least one of the multiple devices.

Example 14 includes the computing device of example 1, wherein the position is determined via at least one of a camera, a gyroscope included in the hearing device, ultrasonic localization methods, an accelerometer, or Wi-Fi localization methods.

Example 15 includes a non-transitory machine readable storage medium comprising instructions that, when executed, cause processor circuitry to at least access audio data corresponding to multiple devices, ones of the multiple devices positioned at spatial locations relative to a listener, identify a position of the listener relative to the multiple devices, adjust, based on the spatial locations and the position of the listener, the audio data associated with at least one of the multiple devices, transmit the adjusted audio data to a hearing device associated with the listener, the adjusted audio data including a binaural sound corresponding to each of the spatial locations.

Example 16 includes the non-transitory machine readable storage medium of example 15, wherein the position is based on at least one of a head of the listener, eyes of the listener, a body of the listener, or an attention of the listener.

Example 17 includes the non-transitory machine readable storage medium of example 16, wherein the eyes are looking at a first one of the multiple devices, and wherein the instructions cause the at least one processor to adjust a gain associated with the first one of the multiple devices.

Example 18 includes the non-transitory machine readable storage medium of example 17, wherein the instructions cause the at least one processor to increase a gain associated with the first one of the multiple devices based on the eyes.

Example 19 includes the non-transitory machine readable storage medium of example 16, wherein the head is oriented towards a first one of the multiple devices, and wherein the instructions cause the at least one processor to adjust, based on the head oriented towards the first one of the multiple devices, the audio data associated with the first one of the multiple devices.

Example 20 includes the non-transitory machine readable storage medium of example 15, wherein the instructions cause the at least one processor to adjust a gain associated with the at least one of the multiple devices.

Example 21 includes the non-transitory machine readable storage medium of example 20, wherein a first one of the multiple devices is positioned at a first spatial location and a second one of the multiple devices is positioned at a second spatial location, the first spatial location positioned closer to the listener than the second spatial location, and wherein the instructions cause the at least one processor to increase the gain associated with the first one of the multiple devices.

Example 22 includes the non-transitory machine readable storage medium of example 21, wherein the instructions cause the at least one processor to decrease the gain associated with the second one of the multiple devices.

Example 23 includes the non-transitory machine readable storage medium of example 15, wherein the instructions cause the at least one processor to detect a change in the position of the listener, and adjust, based on the spatial locations and the changed position, the audio data associated with at least one of the multiple devices.

Example 24 includes the non-transitory machine readable storage medium of example 23, wherein the change in the position includes at least one of a change in eye orientation of the listener, a change in head orientation of the listener, a change in body orientation of the listener, or a change of attention of the listener.

Example 25 includes the non-transitory machine readable storage medium of example 15, wherein the multiple devices include a computing device associated with the listener.

Example 26 includes the non-transitory machine readable storage medium of example 15, wherein the instructions cause the at least one processor to access a voice command of the listener, and adjust, based on the voice command, the audio data associated with at least one of the multiple devices.

Example 27 includes the non-transitory machine readable storage medium of example 15, wherein the instructions cause the at least one processor to access a preference of the listener, and adjust, based on the preference, the audio data associated with at least one of the multiple devices.

Example 28 includes the non-transitory machine readable storage medium of example 15, wherein the position is determined via at least one of a camera, a gyroscope included in the hearing device, ultrasonic localization methods, an accelerometer, or Wi-Fi localization methods.

Example 29 includes a method comprising accessing, by executing an instruction with a processor, audio data corresponding to multiple devices, ones of the multiple devices positioned at spatial locations relative to a listener, identifying, by executing an instruction with the processor, a position of the listener relative to the multiple devices, adjusting, by executing an instruction with the processor, based on the spatial locations and the position of the listener, the audio data associated with at least one of the multiple devices, transmitting, by executing an instruction with the processor, the adjusted audio data to a hearing device associated with the listener, the adjusted audio data including a binaural sound corresponding to each of the spatial locations.

Example 30 includes the method of example 29, wherein the position is based on at least one of a head of the listener, eyes of the listener, a body of the listener, or an attention of the listener.

Example 31 includes the method of example 30, further including adjusting, based on the eyes looking at a first one of the multiple devices, the audio data associated with the first one of the multiple devices.

Example 32 includes the method of example 31, further including increasing a gain associated with the first one of the multiple devices based on the eyes.

Example 33 includes the method of example 30, further including adjusting, based on the head oriented towards a first one of the multiple devices, the audio data associated with the first one of the multiple devices.

Example 34 includes the method of example 29, further including adjusting a gain associated with the at least one of the multiple devices.

Example 35 includes the method of example 34, wherein a first one of the multiple devices is positioned at a first spatial location and a second one of the multiple devices is positioned at a second spatial location, the first spatial location positioned closer to the listener than the second spatial location, further including increasing the gain associated with the first one of the multiple devices based on the first spatial location being closer to the listener than the second spatial location.

Example 36 includes the method of example 35, further including decreasing the gain associated with the second one of the multiple devices.

Example 37 includes the method of example 29, further including detecting a change in the position of the listener, and adjusting, based on the spatial locations and the changed position, the audio data associated with at least one of the multiple devices.

Example 38 includes the method of example 37, wherein the change in the position includes at least one of a change in eye orientation of the listener, a change in head orientation of the listener, a change in body orientation of the listener, or a change of attention of the listener.

Example 39 includes the method of example 29, wherein the multiple devices include a computing device associated with the listener.

Example 40 includes the method of example 29, further including accessing a voice command of the listener, and adjusting, based on the voice command, the audio data associated with at least one of the multiple devices.

Example 41 includes the method of example 29, further including accessing a preference of the listener, and adjusting, based on the preference, the audio data associated with at least one of the multiple devices.

Example 42 includes the method of example 29, wherein the position is determined via at least one of a camera, a gyroscope included in the hearing device, ultrasonic localization methods, an accelerometer, or Wi-Fi localization methods.

Example 43 includes an apparatus comprising means for accessing audio data corresponding to multiple devices, ones of the multiple devices positioned at spatial locations relative to a listener, means for identifying a position of the listener relative to the multiple devices, means for adjusting, based on the spatial locations and the position of the listener, the audio data associated with at least one of the multiple devices, means for transmitting the adjusted audio data to a hearing device associated with the listener, the adjusted audio data including a binaural sound corresponding to each of the spatial locations.

Example 44 includes the apparatus of example 43, wherein the position is based on at least one of a head of the listener, eyes of the listener, a body of the listener, or an attention of the listener.

Example 45 includes the apparatus of example 44, wherein the eyes are looking at a first one of the multiple devices, the means for adjusting to adjust, based on the eyes looking at the first one of the multiple devices, the audio data associated with the first one of the multiple devices.

Example 46 includes the apparatus of example 45, wherein the means for adjusting is to increase a gain associated with the first one of the multiple devices based on the eyes.

Example 47 includes the apparatus of example 44, wherein the head is oriented towards a first one of the multiple devices, the means for adjusting to adjust, based on the head oriented towards the first one of the multiple devices, the audio data associated with the first one of the multiple devices.

Example 48 includes the apparatus of example 43, wherein the means for adjusting is to adjust a gain associated with the at least one of the multiple devices.

Example 49 includes the apparatus of example 48, wherein a first one of the multiple devices is positioned at a first spatial location and a second one of the multiple devices is positioned at a second spatial location, the first spatial location positioned closer to the listener than the second spatial location, and wherein the means for adjusting is to increase the gain associated with the first one of the multiple devices based on the first spatial location being closer to the listener than the second spatial location.

Example 50 includes the apparatus of example 49, wherein the means for adjusting is to decrease the gain associated with the second one of the multiple devices.

Example 51 includes the apparatus of example 43, wherein means for identifying is to detect a change in the position of the listener, and the means for adjusting to adjust, based on the spatial locations and the changed position, the audio data associated with at least one of the multiple devices.

Example 52 includes the apparatus of example 51, wherein the change in the position includes at least one of a change in eye orientation of the listener, a change in head orientation of the listener, a change in body orientation of the listener, or a change of attention of the listener.

Example 53 includes the apparatus of example 43, wherein the multiple devices include a computing device associated with the listener.

Example 54 includes the apparatus of example 43, wherein the means for accessing is to access a voice command of the listener, and the means for adjusting is to adjust, based on the voice command, the audio data associated with at least one of the multiple devices.

Example 55 includes the apparatus of example 43, wherein the means for accessing is to access a preference of the listener, and the means for adjusting is to adjust, based on the preference, the audio data associated with at least one of the multiple devices.

Example 56 includes the apparatus of example 43, wherein the position is determined via at least one of a camera, a gyroscope included in the hearing device, ultrasonic localization methods, an accelerometer, or Wi-Fi localization methods.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A computing device comprising:

at least one memory;

machine readable instructions; and processor circuitry to at least one of instantiate or execute the machine readable instructions to:

access audio data corresponding to multiple devices, the audio data including respective independent audio streams from each of the multiple devices, each of the multiple devices positioned at respective spatial locations relative to a listener;

identify a position of the listener relative to each of the multiple devices, including identifying an orientation of eyes of the listener;

adjust, based on the respective spatial locations, the position of the listener, and the orientation of the eyes of the listener, the audio data associated with at least one of the multiple devices to generate adjusted audio data for each of the multiple devices, the adjusted audio data including a binaural sound for each of the multiple devices, the binaural sound corresponding to each of the respective spatial locations;

combine the adjusted audio data from each of the multiple devices to generate combined audio data; and transmit the combined audio data to a hearing device associated with the listener.

2. The computing device of claim 1, wherein identifying the orientation of the eyes of the listener includes identifying that the eyes are open and identifying a viewing direction.

3. The computing device of claim 2, wherein the eyes are looking at a first one of the multiple devices, and wherein the processor circuitry is to:

adjust, based on the eyes looking at the first one of the multiple devices, the audio data associated with the first one of the multiple devices, including increasing a gain of the audio data associated with the first one of the multiple devices.

4. The computing device of claim 1, wherein a first one of the multiple devices is positioned at a first spatial location and a second one of the multiple devices is positioned at a second spatial location, the first spatial location positioned closer to the listener than the second spatial location, and wherein the processor circuitry is to:

increase a gain associated with the first one of the multiple devices.

5. The computing device of claim 4, wherein the processor circuitry is to decrease the gain associated with the second one of the multiple devices.

6. The computing device of claim 1, wherein the processor circuitry is to:

detect a change in the orientation of the eyes of the listener; and adjust, based on the spatial locations and the changed orientation, the audio data associated with at least one of the multiple devices.

7. The computing device of claim 6, wherein the change in the position includes a change in viewing direction.

8. The computing device of claim 1, wherein the multiple devices include the computing device.

9. The computing device of claim 1, wherein the processor circuitry is to:

access a voice command of the listener; and adjust, based on the voice command, the audio data associated with at least one of the multiple devices.

10. The computing device of claim 1, wherein the processor circuitry is to:

access a preference of the listener; and adjust, based on the preference, the audio data associated with at least one of the multiple devices.

11. The computing device of claim 1, wherein the orientation of the eyes is determined via at least one of a camera, a gyroscope included in the hearing device, ultrasonic localization methods, an accelerometer, or Wi-Fi localization methods.

12. The computing device of claim 1, wherein the processor circuitry is to determine a respective angle of arrival of audio data from each respective device of the multiple devices based on the respective spatial locations.

13. The computing device of claim 12, wherein the processor circuitry is to determine, based on a head orientation of the listener, a corresponding head-related transfer function for the audio data from each respective device of the multiple devices.

14. The computing device of claim 13, wherein adjusting the audio data includes adjusting the binaural sound associated with each of the multiple devices by changing, based on the orientation of the eyes of the listener, the corresponding head-related transfer function for the audio data from each respective device of the multiple devices.

15. A non-transitory machine readable storage medium comprising instructions that, when executed, cause processor circuitry to at least:

access audio data corresponding to multiple devices, the audio data including respective independent audio streams from each of the multiple devices, ones of the multiple devices positioned at spatial locations relative to a listener;

identify a position of the listener relative to each of the multiple devices, including identifying an orientation of eyes of the listener;

adjust, based on the respective spatial locations, the position of the listener, and the orientation of the eyes of the listener, the audio data associated with at least one of the multiple devices to generate adjusted audio data for each of the multiple devices, the adjusted audio data including a binaural sound for each of the multiple devices, the binaural sound corresponding to each of the respective spatial locations;

combine the adjusted audio data from each of the multiple devices to generate combined audio data; and transmit the combined audio data to a hearing device associated with the listener.

16. The non-transitory machine readable storage medium of claim 15, wherein identifying the orientation of the eyes of the listener includes identifying that the eyes are open and identifying a viewing direction.

17. The non-transitory machine readable storage medium of claim 16, wherein the eyes are looking at a first one of the multiple devices, and wherein the instructions cause the at least one processor to adjust a gain associated with the first one of the multiple devices, including increasing a gain of the audio data associated with the first one of the multiple devices.

18. The non-transitory machine readable storage medium of claim 15, wherein the instructions cause the at least one processor to:

detect a change in the orientation of the eyes of the listener; and adjust, based on the spatial locations and the changed orientation, the audio data associated with at least one of the multiple devices.

19. An apparatus comprising:

means for accessing audio data corresponding to multiple devices, the audio data including respective independent audio streams from each of the multiple devices, each of the multiple devices positioned at respective spatial locations relative to a listener;

means for identifying a position of the listener relative to each of the multiple devices, including identifying an orientation of eyes of the listener;

means for adjusting, based on the respective spatial locations, the position of the listener, and the orientation of the eyes of the listener, the audio data associated with at least one of the multiple devices to generate adjusted audio data for each of the multiple devices, the adjusted audio data including a binaural sound for each of the multiple devices, the binaural sound corresponding to each of the respective spatial locations;

means for combining the adjusted audio data from each of the multiple devices to generate combined audio data; and means for transmitting the combined audio data to a hearing device associated with the listener.

20. The apparatus of claim 19, wherein identifying the orientation of the eyes of the listener includes identifying that the eyes are open and identifying a viewing direction.

21. The apparatus of claim 20, wherein the eyes are looking at a first one of the multiple devices, the means for adjusting to adjust, based on the eyes looking at the first one of the multiple devices, the audio data associated with the first one of the multiple devices.

22. The apparatus of claim 21, wherein the means for adjusting is to increase a gain associated with the first one of the multiple devices based on the eyes.

23. The apparatus of claim 20, wherein the head is oriented towards a first one of the multiple devices, the means for adjusting to adjust, based on the head oriented towards the first one of the multiple devices, the audio data associated with the first one of the multiple devices.

24. The apparatus of claim 19, wherein means for identifying is to detect a change in the orientation of the eyes of the listener; and the means for adjusting to adjust, based on the spatial locations and the changed orientation, the audio data associated with at least one of the multiple devices.

* * * * *